United States Patent [19]

Raviv

[11] Patent Number: 4,873,651
[45] Date of Patent: Oct. 10, 1989

[54] METHOD AND APPARATUS FOR RECONSTRUCTING THREE-DIMENSIONAL SURFACES FROM TWO-DIMENSIONAL IMAGES

[75] Inventor: Daniel Raviv, University Heights, Ohio

[73] Assignee: Case Western Reserve University, Cleveland, Ohio

[21] Appl. No.: 41,041

[22] Filed: Apr. 21, 1987

[51] Int. Cl.⁴ .............................................. G06F 15/20
[52] U.S. Cl. .................................... 364/513; 250/224; 356/375; 364/559
[58] Field of Search .................... 364/513, 413–415, 364/560–563, 559, 413.19; 356/375–377, 1, 2, 388, 392–394; 250/224, 560, 578, 234, 235, 236, 491.1

[56] References Cited

U.S. PATENT DOCUMENTS

| | | | |
|---|---|---|---|
| 4,041,321 | 8/1977 | Linard | 250/227 X |
| 4,488,173 | 12/1984 | DiMatteo et al. | 364/559 |
| 4,630,225 | 12/1986 | Hisano | 364/559 |
| 4,672,557 | 6/1987 | Tamura et al. | 364/559 X |
| 4,680,802 | 7/1987 | Nishida et al. | 364/559 X |

OTHER PUBLICATIONS

Sinden, "Shape Information from Rotated Scans", PAMI-7, IEEE Trans. on Pattern Analysis and Machine Intelligence, (1985), pp. 726–730.
Ikeuchi "Numerical Shape from Shading and Occluding Boundaries", 17 vol. *Artificial Intelligence* (1981) pp. 141–84.
Kender, et al., "Shape from Darness", American Assn. for Artificial Intelligence Conference (Aug. 1986) pp. 664–669.
Pentland, "Shading Into Texture", *From Pixels to Predicates*, Pentland Ed (1986) pp. 253–267.
Horn, "Shape from Shading", Doctoral Thesis, MIT, Jun 1970, pp. 1–25.

*Primary Examiner*—Joseph Riggiero
*Attorney, Agent, or Firm*—Renner, Otto, Boisselle & Sklar

[57] ABSTRACT

A method and apparatus for reconstructing the surface, i.e the third dimension, of a three-dimensional object from two-dimensional information includes projecting radiant energy, such as light, from a substantially parallel ray source at said object at a number of different angles relative to a reference surface with respect to which the object is placed. The lengths and locations of shadows cast by the object are measured as a function of the angle of the light rays. The location of the surface of the object relative to the reference surface is determined from the shadow lengths and locations from the angles at which the respective shadow lengths are created. Preferably, the shadow lengths and locations are measured by an electronic camera that generates electrical signals indicative of the shadow image. These signals are preferably received by a computer that determines the location of the surface of the object relative to the reference surface. Preferably, the computer also controls the position of the energy source. The method is relatively insensitive to variations in measurement and signal processing conditions. The position information produced in applying the method may be used in many applications, for example, for positioning a robot gripper to retrieve a part from a bin.

26 Claims, 15 Drawing Sheets

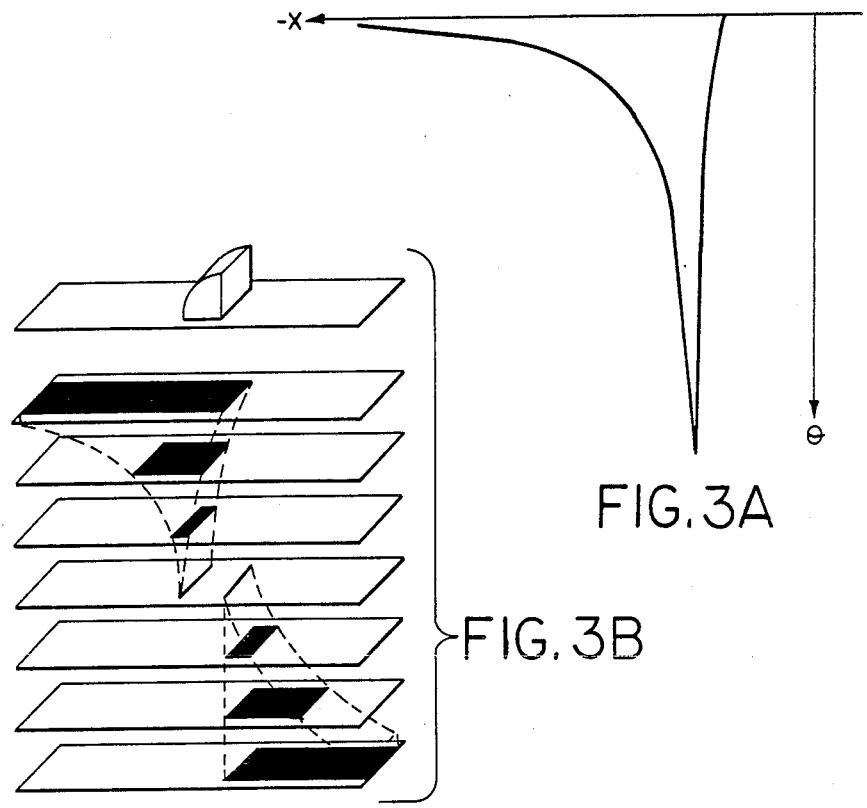
FIG. 3A
FIG. 3B
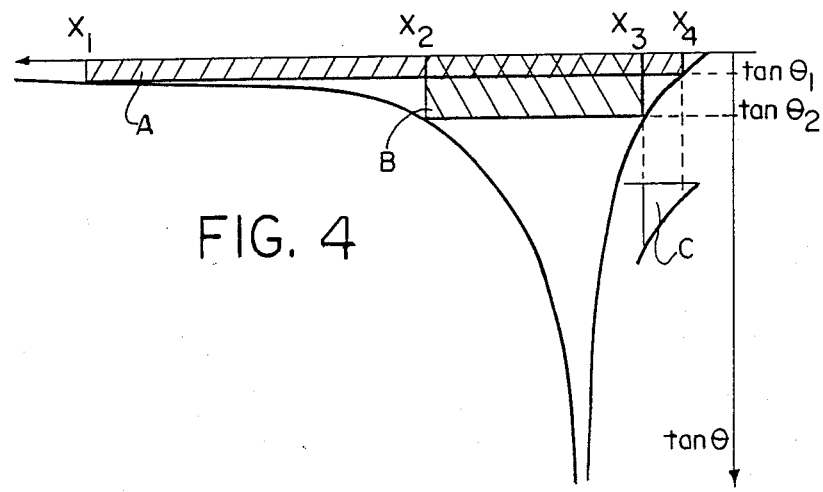
FIG. 4

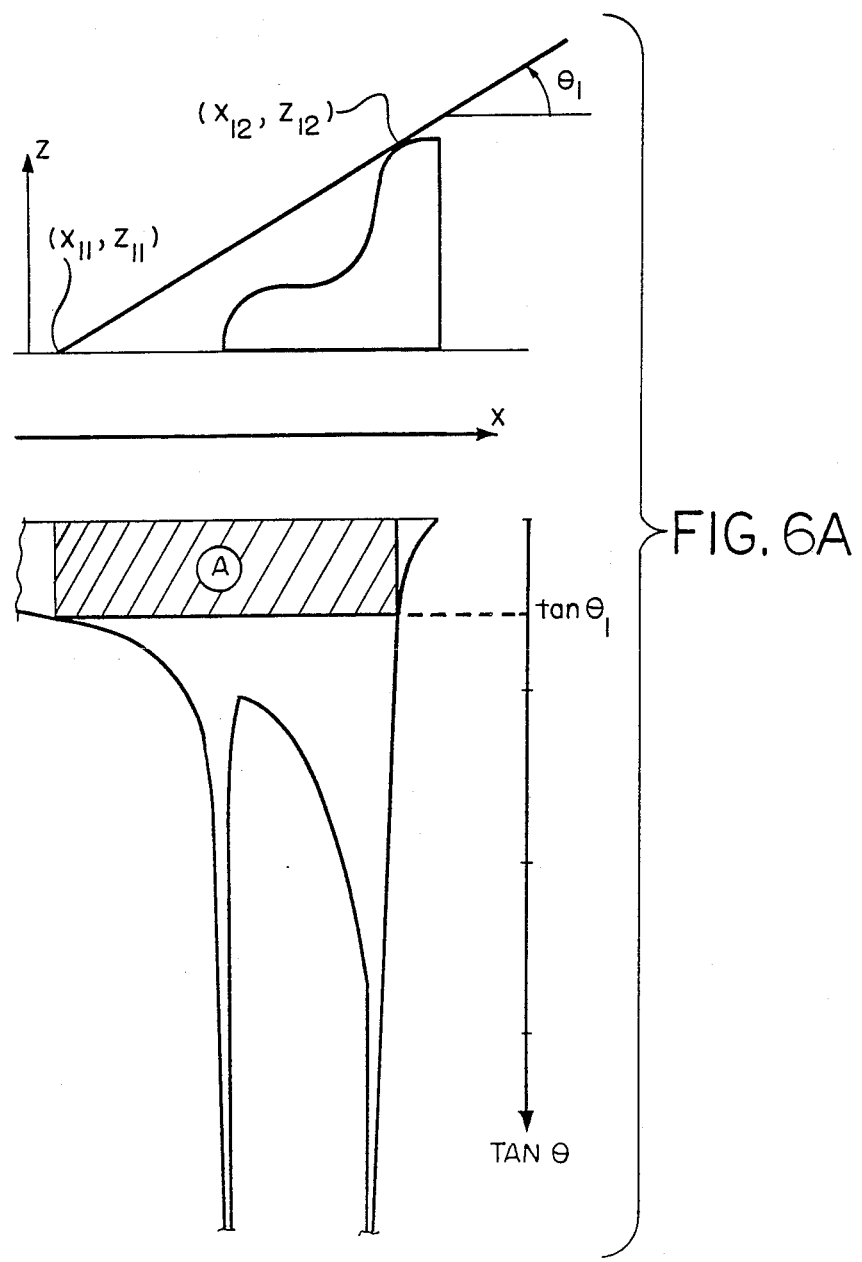

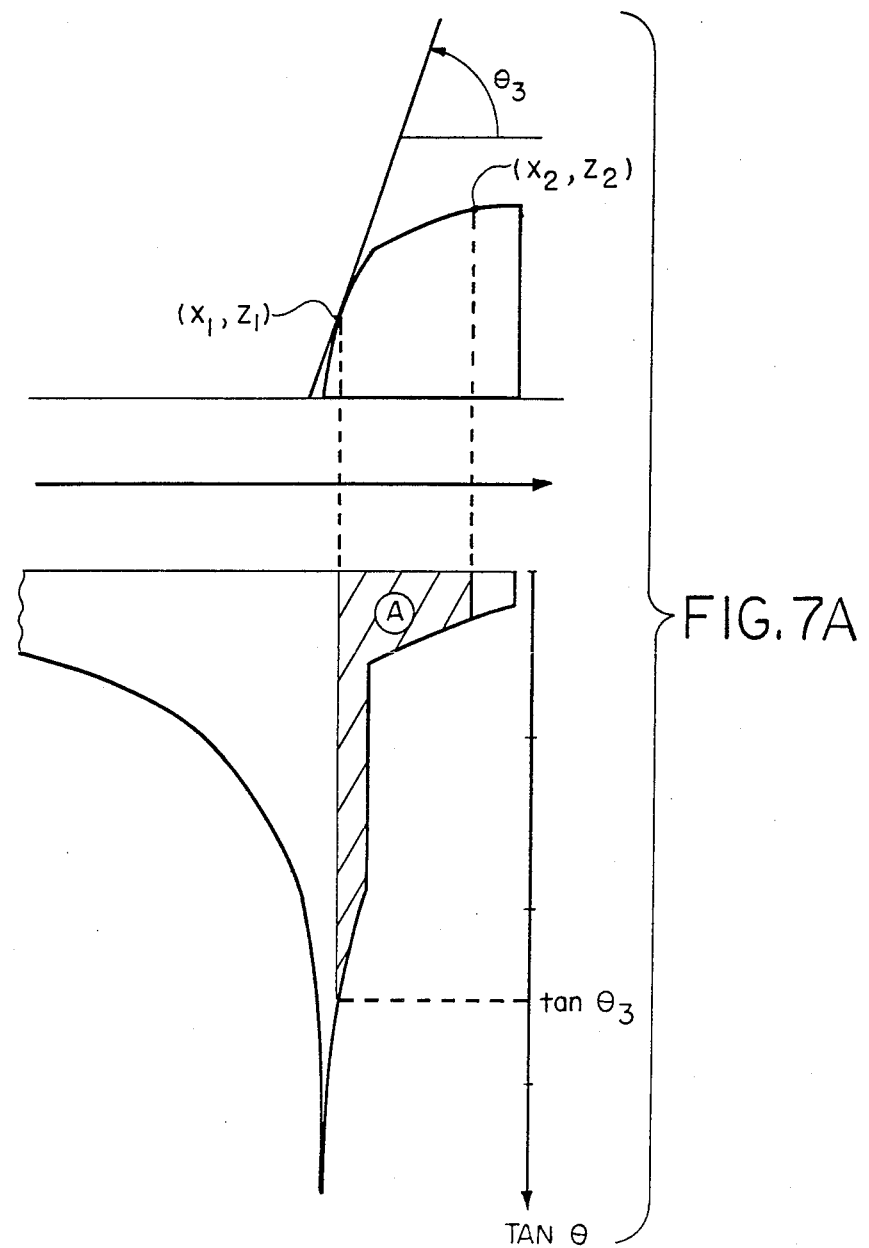

METHOD AND APPARATUS FOR RECONSTRUCTING THREE-DIMENSIONAL SURFACES FROM TWO-DIMENSIONAL IMAGES

BACKGROUND

This disclosure concerns a method for reconstructing the three-dimensional surfaces of opaque solid objects from a plurality of two-dimensional, preferably binary, images for automated determination of shape, location and orientation of the object.

In the science of robotics and computer vision, it is frequently important to determine the shape, orientation and location of a solid object. For example, when a robot gripper is to retrieve an object from a bin containing a number of the same objects, such a determination must be made. The determination is necessary in order that a robot gripper can be oriented and positioned to select an object from the top of the bin. Otherwise, no object may be retrieved or the parts and/or gripper may be damaged. In general, automated instrumentation is able to create two-dimensional images of three-dimensional objects. By using information gleaned from one or more of these two-dimensional images, decisions on object shape, location and orientation are made, usually by a computer. However, many of these known techniques require a priori knowledge of the object shape to simplify the orientation and location decisions.

In some of the known techniques, two similar two-dimensional views of the same scene are created. These two views are matched in some fashion to produce three-dimensional information for solving the object location problem. It is well known that the two pictures may produce ambiguities when combined. This ambiguity is called the correspondence problem. Many of these techniques use sophisticated mathematical manipulation of the digitized information that comprises the two-dimensional images in order to derive third dimension information. Substantial amounts of computing power are consumed in calculating the three-dimensional information that can be obtained from the two views.

In a different technique, one or more images of the same scene, for example parts disposed in a bin, are made from a fixed point but under varying illumination conditions. Surface orientations are then determined from the relative brightness of various points in each of the images. This method suffers from an inability to determine three-dimensional information concerning areas of the images that are always in shadows.

Range finding techniques employing beams of ultrasonic energy with time of flight estimating circuitry have also been used to calculate third dimension information. This method is inaccurate because the range finding beams are wide resulting in substantial errors, especially in gathering data about relatively small objects.

Coherent light may be used to narrow the beam width, but times of flight are difficult to measure at the speed of light. Using laser illumination in the known techniques is particularly time consuming since surfaces are illuminated and reconstructed only one point at a time.

In another method involving illumination, alternating light and dark stripes are projected on objects. However, the pattern produced frequently includes discontinuities that interfere with reconstruction of the third dimension information. Likewise, light from a source including a grid of intersecting pairs of parallel lines can be projected on a scene. However, third dimension information derived from the shape of the projected lines versus the initial grid can result in substantial errors in shape determination.

The described and other techniques that measure the intensity of light reflected objects in a scene suffer from a number of common problems. All depend, to some degree, on the smoothness or texture of the surface. A shiny surface producing "glint" usually significantly interferes with the efficiency of these methods. In addition, absent a priori knowledge of object shape, the methods are not robust. For example, variations from presumed surface reflection characteristics can result in substantial errors in third dimensional data. Each of the known light reflection methods suffers from other similar sensitivities, that is, variations in the conditions under which two-dimensional data is gathered can result in substantial error in the calculation of the third dimension information. Moreover, many of the known methods can only reconstruct three-dimensional information concerning objects of relatively simple shapes.

Accordingly, in order to reconstruct the third dimension of objects reliably from two-dimensional data, a method is needed that is not dependent on a priori knowledge of object shape, that does not consume significant computational power, that is not dependent on the type of surface finish of the object being reconstructed, that can reconstruct nearly any type of object that is opaque to a sensing beam and that is relatively insensitive to variations in the conditions under which the two-dimensional information is gathered.

SUMMARY OF THE INVENTION

In the invention a method and apparatus for reconstructing the shape of a three-dimensional object from two-dimensional information that overcomes the shortcomings of the known methods and apparatus is provided.

In one method according to the invention, an object whose shape is to be determined is placed relative to a reference surface. A beam of substantially parallel rays of light is projected at the object at each of a plurality of different azimuthal angles relative to the reference surface. The positions and lengths of the shadows cast by the object at each of the angles is measured. From measuring or recording the relative position and length of a shadow cast by the light and the angle of the light relative to the reference surface at which the shadow is cast, the dimension of the object normal to the reference surface at the point in the object at which light is tangent may be determined. The absolute normal dimension may be determined by multiplying a shadow length and the tangent of the light angle. The dimension may also be determined with reference to a known point on the object by integrating the shadow length versus light angle function between the known point and an unknown point. By carrying out this process for a number of locations, each corresponding to a different angle of light projection, at least a portion of the surface of the object can be reconstructed. Preferably, a sequence of shadows is formed by projecting light from a number of locations all of which lie substantially in an azimuthal plane. By measuring or recording the lengths and relative positions of the shadows cast in that plane, a portion of the surface of the object lying along that plane may be reconstructed. By measuring or recording the lengths and relative positions of shadows in several such planes, preferably substantially parallel to each other, a large portion of the surface of the object can be reconstructed.

Light can be projected from a single source that is moved through various orientations within an azimuthal plane, so that a number of shadows may be cast, each at a different angle relative to the reference surface. Alternatively, a number of different light sources, sequentially illuminated, can be employed to produce a sequence of shadows from which the third dimension of the object can be determined. In still another embodiment, a pivotally mounted, single light source may be employed with mirrors to produce the desired shadows sequentially.

Preferably the lengths and relative positions of the shadows cast by the object are measured or recorded by forming an image of the shadows with a camera and recording that image. Preferably, the camera is electronic and generates electrical signals that represent light and dark, i.e. illuminated and shadowed, areas of the object for each position of the light source. A threshold test may be applied to each electrical signal to determine whether it represents a light or dark area and to eliminate noise signals. The camera provides two-dimensional information on the object shape when the camera is disposed opposite the reference surface. From this two-dimensional information, the third dimension and shape of the object can be determined. That is, with the three-dimensional information the shape, location, and orientation of the object can be determined. In response to this information, a robot gripper may be positioned to grasp, move or otherwise manipulate the object.

The novel method is a robust one since it is not susceptible to errors attributable to the surface finish of the object. The method does not rely on the quality of light reflected from the surface, but only upon the shadows cast and so is not affected by the surface finish of the object. Furthermore, by applying a threshold test to the signals representing the image of the object, the potential for error in measurement is significantly reduced over known processes. No a priori knowledge of the object's shape is required to determine an object's shape, location and orientation. The shapes of objects with an extremely broad range of surfaces can readily be accurately determined by applying the method. The calculations required in carrying out the method are simple so that surface shape determination can be made by a computer in a relatively short time.

In another novel method, a source of parallel rays of radiant energy, such as light, is moved equatorially with respect to an object or objects disposed relative to a reference plane. At each of the angular positions of the light source, the areas of reflected light and of shadow are determined. The determination may be made by a camera taking a series of pictures, which consist of data points indicating light or darkness. The pictures are then compared, for example by superimposing the pictures in registration. The areas that remain bright, i.e. are always illuminated in the superposition, represent topmost surfaces. When the method is applied to objects disposed in a bin, the topmost object in the bin may be readily identified and its orientation and relative location can be determined. A robot gripper can be guided using this information.

The methods just described may be combined. The equatorial light source motion method may be used to locate the topmost surface in the bin. Thereafter, the azimuthal method, with the benefit of the results of the equatorial method can be used to locate the topmost article absolutely so that a robot gripper can be precisely located.

BRIEF DESCRIPTION OF THE DRAWINGS

In the annexed drawings:

FIG. 3A shows an example of shadow information concerning the object shown in FIG. 2 produced in accordance with the invention;

FIG. 3B is an illustration of the construction of shadow information;

FIG. 4 shows an example of a modified shadow information concerning the object shown in FIG. 2 produced in accordance with the invention;

FIGS. 6A, 6B and 6C show shadow information produced in accordance with the invention concerning the section of the object shown in FIG. 5;

FIGS. 7A, 7B and 7C are further illustrations of the use of shadow information in accordance with the invention;

DETAILED DESCRIPTION OF PREFERRED EMBODIMENTS

Figure 1A:
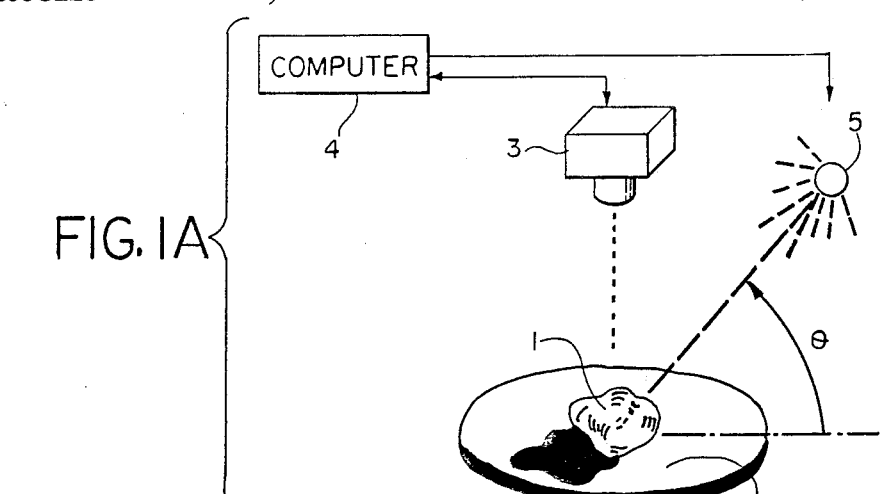
FIG. 1A is a pictorial view of apparatus according to one embodiment of the invention.

In FIG. 1A a schematic diagram of one apparatus for carrying out the novel method is shown. An object 1, the shape of which is to be determined, is disposed on a reference surface 2. As shown, it is preferred that the reference surface be planar, although other reference surface contours can be used so long as their shapes are know in advance of the reconstruction of object 1. A camera 3 is disposed opposite surface 2 and directed toward the object. Camera 3 is preferably an electronic camera that generates electrical signals in response to the image it forms. For example, camera 3 could be a charge coupled device (CCD) camera that forms an image composed of pixels, each having an amplitude related to the amount of light falling on a particular area of the CCD sensor. The electrical signals produced by camera 3 are transmitted to a computer 4 where the three-dimensional shape of object 1 is reconstructed in response to the two-dimensional information provided by camera 3. A light source 5 projects a beam of generally parallel light rays in the direction of object 1 at an angle (theta) relative to reference surface 2. Theta is a variable, that is the angle of light 5 relative to surface 2 may be varied. As indicated, the orientation of the light source is supplied to computer 4 in order to correlate recorded shadow lengths and locations with the angle of the light rays. The position of light source 5 and its state, illuminated or extinguished, may preferably be directed controlled by computer 4.

In the apparatus just described, it is assumed that camera 3 is at a fixed location relative to reference surface 2 and light source 5 is movable through an angular range preferably corresponding to a theta greater than 0° and less than 180°. As further explained below, the angular range used may be one or more segments of the 180° are and need not begin near 0° nor end near 180°. Light source 5 is shown moving in an azimuthal plane, although movement along other paths that need not be planar, is also possible. While it is convenient to move light source 5 while object 1 is fixed, it is relative movement between them that produces the changing shadows. Object 1 and reference surface 2 could move together with camera 3 while light source 5 is fixed. Light source 5 could be a point source in combination with a lens to produce the parallel rays that are important to the novel process.

As is apparent from FIG. 1A, when light source 5 forms only a small angle with surface 2, object 1 casts a relatively long shadow on reference surface 2 beginning adjacent object 1. As the angle theta increases, the length of the shadow changes in a manner related to the shape of the object. By measuring the length and position of the shadows cast as a function of the position of light source 5, the shape of the object can be determined.

While not required to practice the novel method, it is preferred that the illumination of object 1 by source 5 take place within a plane. That is, assuming that light source 5 is movable, it is preferred that its movement be restricted to an azimuthal plane intersecting object 1. This result can be accomplished with a single light source that is mounted on an appropriate fixture permitting it to move within a plane. At a starting orientation of light source 5, camera 3 forms an image of the illuminated object and its shadow. Light source 5, is then moved to a larger theta angle and another image of the shadow is recorded. This process continues through a plurality of orientations of light source 5 so that a number of different shadows of object 1 are formed. Preferably, the shadow length and position information is stored within computer 4 where it is correlated with the angular position of light source 5.

Figure 1B:
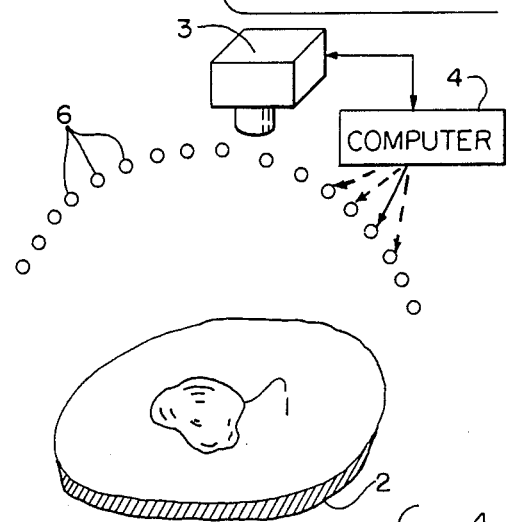
FIGS. 1B and 1C illustrate alternative light source configurations in apparatus according to the invention.
Figure 1C:
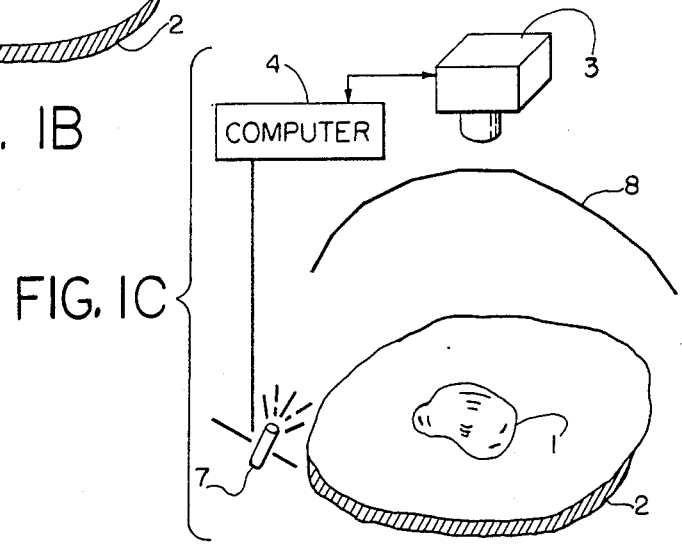

The shadows cast by orienting light source 5 at a number of different angles within a plane and above object 1 may be accomplished by other, alternative apparatus. For example, rather than using single light source, as shown in FIG. 1B, a plurality of light sources 6 may be disposed opposite object 1 from surface 2, all at different thetas. Under the control of computer 4, the light sources are illuminated in sequence and an image is formed by camera 3 when each of the light sources in individually illuminated. The same result can be accomplished, as illustrated in FIG. 1C, with a single light source 7 pivotally mounted so as to be directed at each of a plurality of mirrors 8 supposed to produce the same light beam if a light source were disposed in place of each of the mirrors.

If the light source or its equivalent is disposed so as to generate a series of shadows as illumination begins at a theta near 0° and steps through various locations to reach a theta near 180°, information can be gathered from the images generated by the camera from which the third dimension of the object can be determined. It is convenient to move the light source effectively through a plane so that planar "slices" of the object can be reconstructed. When a series of substantially parallel slices of the object are assembled, the surface of the entire object may be reconstructed.

Figure 2:
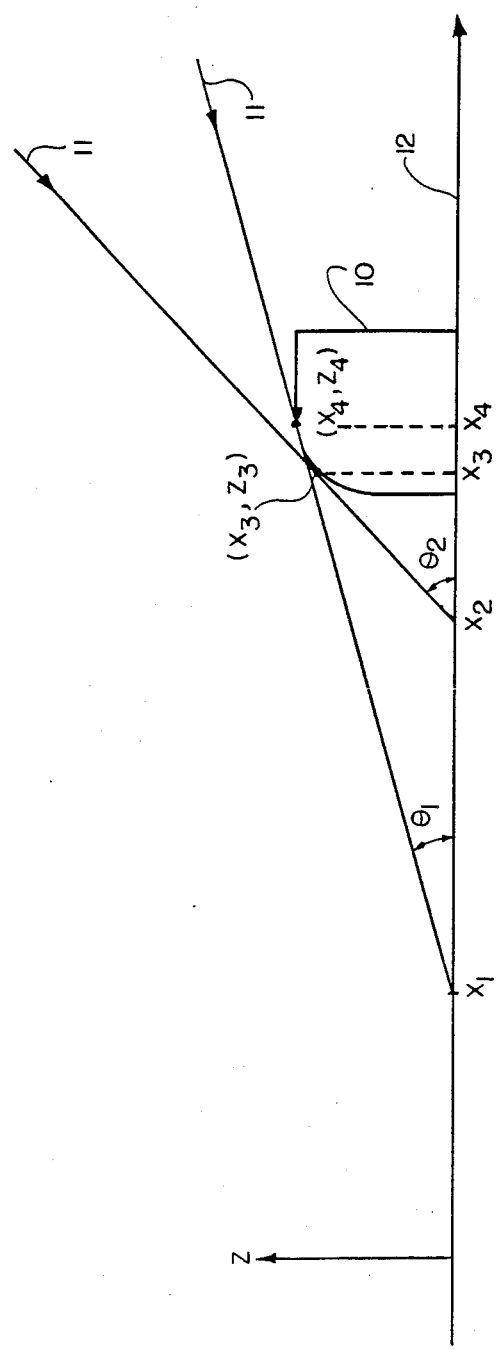
FIG. 2 is a pictorial illustration of a method according to the invention.

An example of reconstruction of a single slice of a relatively simple object is illustrated with the aid of FIG. 2. A section or slice of an object 10 as shown in FIG. 2 includes a flat bottom, a flat side and two partially flat surfaces that gently and continuously curve into each other. As indicated, light source 11 is projected across object 10 at angles ranging from near 0° to 90° with respect to a reference surface 12 on which object 10 is placed. A shadow of varying length is cast as angle theta increases. The length and position of the shadow cast is plotted in FIG. 3A on the x-axis as a function of the angle of light source 11 with respect to the reference surface 12 at which the shadow is cast. The light angle is plotted on a theta axis which, for convenience, in FIG. 3A is shown below object 10. The placement of the shadow diagram directly below the picture of the section aids in understanding the reconstruction process. As a further aid to understanding the generation of the shadow diagram, FIG. 3B illustrates the shadows cast by the object when the light source is positioned at 30° intervals from 0° to 180° relative to the reference a surface. For simplicity only the shadow information for angles between 0° and 90° is plotted in FIG. 3A. The resulting shadow diagram permits calculation of the dimension of object 10 normal to reference surface 12 beginning at an arbitrary origin along the x-axis, parallel to reference surface 12.

When parallel rays of light illuminate an object, generally some of the rays will strike a point on the object tangentially. These tangentially incident rays define one edge of a shadow cast by the object. The place where those light rays strike the reference surface define the other edge of the shadow. As shown in FIG. 2, the locations of those shadow edges and the light position may be use to reconstruct the object. The third dimension of the object, the distance along the normal from the reference surface to the point on the object where the light rays are tangent, may be calculated from the simple relationship of equation 1.

$$Z_4 = (X_4 - X_1)\tan\theta_1, \tag{1}$$

where $X_4$ and $X_1$ are the shadow edge positions at $\theta_1$. Likewise, other points on the surface of object 10 with reference surface can be calculated from equation 1.

The shadow plot of FIG. 3A can be replotted as in FIG. 4 changing the ordinate from theta to tangent theta by making the appropriate adjustment. From this new plot, the third dimension data, i.e. the height relative to the reference surface, can be determined by calculating the appropriate area defined by points on the modified shadow curve. For example, the area A of FIG. 4 is $(X_4-X_1) \tan \theta_1$ and so equals the height of object 10 at coordinate $X_4$ according to equation 1. Likewise area B is equal to $(X_3-X_2) \tan \theta_2$ or the height of object 10 at coordinate $X_3$.

In addition to this triangulation method, heights can be found by calculating areas under and bounded by the curve in FIG. 4. From equation 1 it can be seen that the tangent of theta is the derivative of the shape of the surface of object 10 relative to surface 12. Once the height of a coordinate on object 10 is known, other coordinates may be calculated by integrating along the appropriate portion of the curve and adding the proper integration constant. For example, coordinate $Z_4$ can be found from equation 2 if coordinate $Z_3$ is known.

$$Z_4 = Z_3 + \int_{x_3}^{x_4} \tan\theta(X)dx \quad (2)$$

The integral term in Equation 2 represents the area C under the curve in FIG. 4 shown in the inset of FIG. 4. The $Z_3$ term is the integration constant, i.e. the reference point to which the value of $Z_4$ is referred. Once the $Z_3$ term is known, the other Z-axis points on the object can be found by integrating the curve from $Z_3$ to the Z-axis point on the object adding the $Z_3$ integration constant. As the locations of other points on the surface are found, integration from those known points can be undertaken. Further, observing that in FIG. 4 area A equals $Z_4$ and area B equals $Z_3$, it is apparent from equation 2 that area B plus area C equals area A.

In employing the apparatus of FIG. 1, each image of an object and the shadow cast by it comprised a matrix of data points containing shadow position data and light (and shadow) intensity data. A matrix of data points exists for each orientation of light source 5. In recording the matrix of data points, it is preferred that a threshold test be applied, particularly when camera 3 includes a gray scale of many intermediate steps, in order to store each data point as either an illuminated or shadowed location, i.e. in binary form. Computer 4 preferably applies the threshold test treating each point that achieves a minimum level on the camera's gray scale as an illuminated point and treating every other point as a shadowed point.

The shadow information for a particular slice or section of an object is mathematically constructed by selecting data corresponding to that section from each matrix. The necessary calculations, as already detailed for one example, are performed on that slice to reconstruct the third dimension of the object section. This process is repeated for an adjacent, preferable substantially parallel slice, to reconstruct another portion of the surface of the object. This procedure may be repeated until the entire surface reconstructed so that surfaces of the object are entirely reconstructed. In making the reconstruction of each slice, computer 4 needs only to retrieve data from each matrix stored within it, and make simple calculations, such as calculating trigonometric functions, multiplying or numerically integrating using known methods in order to reconstruct the slice. That is, the novel method does not require substantial computing power, meaning that it can be performed quickly on a computer of reasonable size.

The foregoing example concerns a specific form of the novel process. The invention, however, encompasses a broader process. Camera 3 is a sensor or sensing means that may be called the observer, recorder or receiver. The observer should be able to discern reflected light, or the equivalent, from shadows, or their equivalent and to form an image along a line or over an area recording the light and shadow information. By the term light is meant reflected radiation since the invention may employ visible or invisible light, other electromagnetic radiation, acoustic energy, e.g. ultrasonic waves, so long as parallel rays of energy may be directed at an object. Whatever the type of energy source chosen, the receiver should be responsive to the presence and absence of that energy when reflected.

In one embodiment, two different energy sources, e.g. light and acoustical waves, may be used with separate receivers to reconstruct the same object section. These reconstructions may be correlated to improve their accuracy.

Some examples of other embodiments include use of a film rather than electronic camera. If black and white film is used, the shutter of the camera could remain open while the position of the light source moves. Those areas of an object never in shadow will have one intensity, e.g. white, while all other areas will be of the opposite intensity, e.g. black, or some shade of gray. By digitizing the recorded light intensity levels, shadow information like that of FIG. 3 may be constructed. If the camera film or other sensing material is sensitive to colors, by use of different colors of light simultaneously and camera filters or film with limited spectral sensitivity, multiple shadow information may be recorded simultaneously.

As already mentioned, it is the relative movement between the light or radiant energy source and the object that produces the shadow information. In one application of the process, the energy source rays may be in a fixed orientation as objects, such as items on a conveyor belt, pass by the observing means. The relative motion between the objects and observer can produce the shadow information needed to reconstruct the third dimension of an object. In another application, natural and/or artificial topological features can be reconstructed by viewing changing shadows that may be created by relatively moving artificial or natural light. In all the applications described, shadow lengths and positions are measured, not necessarily by measuring particular distances, but are remembered or recorded relatively, so that the described reconstruction can be carried out. Thus the terms measured and recorded are used interchangeably here.

More complex objects produce more complex shadow information. The novel method can produce a shadow information that will accurately describe the third dimension of an object from the two-dimensional information gathered by an image forming element, such as camera 3 FIG. 1. Since only light or shadow conditions are sensed, object surface texture and glint represent no threat to the accuracy of the process. Furthermore, the method is a robust one that is relatively insensitive to variations in the precise lighting conditions employed to view different objects.

An example of a more complex object and the shadow information it produces are shown in FIGS. 5, 6A, 6B and 6C, respectively. Because of the concavity in the object shown in FIG. 5, the shadow plots of FIGS. 6 contain two peaks. Because of the concave portion of the surface of the object, the shadow information splits or divides. That is, there are two maxima, in this instance, for the shadow information. The concavity and resulting split require special attention in the reconstructin of the object. The reconstruction for angles from 0° to $\theta_2$ proceeds as already described in connection with FIGS. 2 and 3.

Figure 6B:
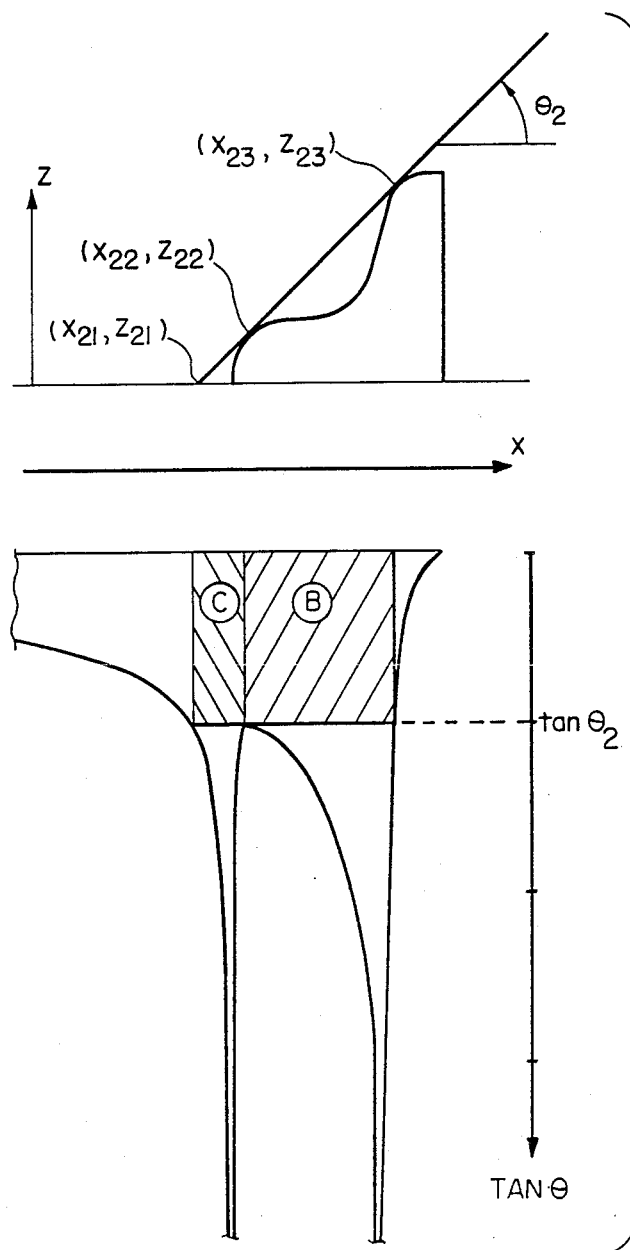

When the $\theta_2$ position of the light source is reached, the light rays become tangent to the object at two points as shown in FIG. 6B. At lower angles, as shown in FIG. 6A, the light rays are tangent to the object only at one point. At the angle $\theta_2$, the height coordinate of the higher point of tangency, $Z_{23}$, may be calculated from positions of the shadow edges ($X_{21}$ and $X_{23}$) and $\theta_2$. With regard to the reference surface, this height equals area B plus area C in the shadow graph of FIG. 6B. From the shadow graph, coordinate $Z_{22}$ equals area C and can also be determined from the minimum in the graph which may be used to divide the total shaded area into the B and C areas.

Figure 6C:
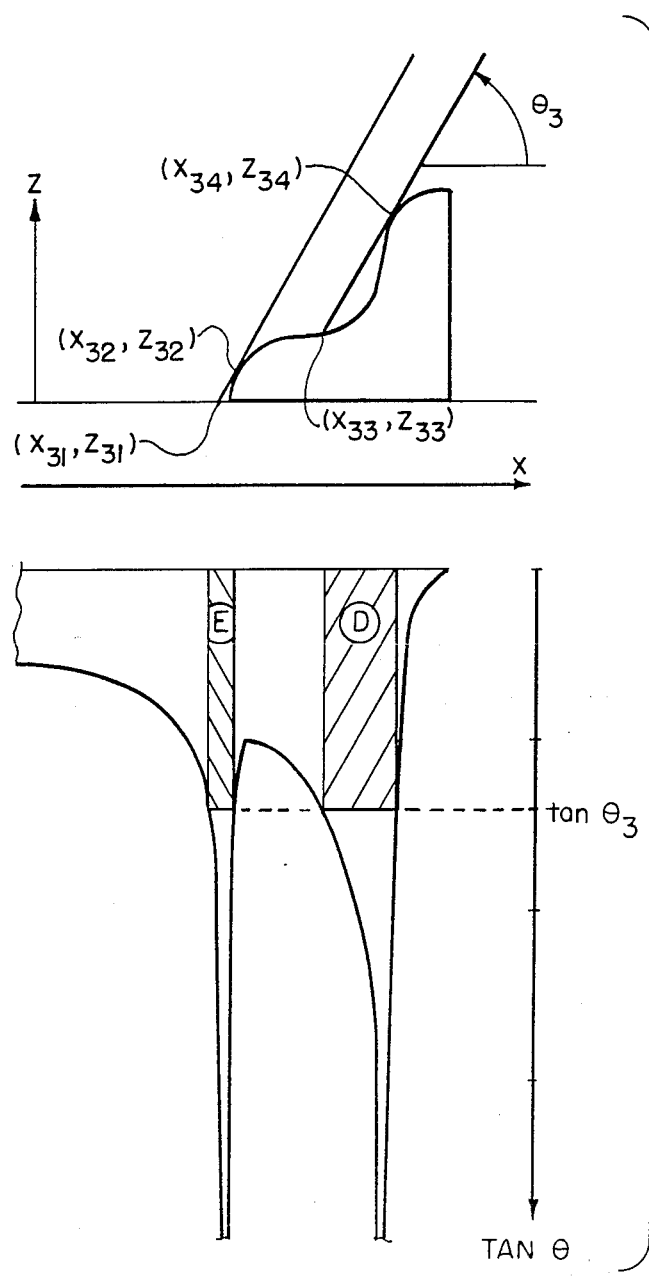

However, when the light source position theta is greater than $\theta_2$, two shadows are formed. The object is partially self shadowed, i.e. the shadow on the object illustrated in FIG. 6C between $X_{33}$ and $X_{34}$, and a second shadow beyond the object, i.e. between $X_{31}$ and $X_{32}$ in FIG. 6C, is also formed. This dual shadow situation is illustrated by the separated areas D and E in the shadow graph of FIG. 6C. Once coordinate $Z_{23}$ on the object is known from FIG. 6B, coordinate $X_{34}$ in FIG. 6C can be found by integration using equation 2 with reference to coordinate $Z_{23}$. Likewise, coordinate $Z_{32}$ can be determined by integrating along the shadow graph from coordinate $Z_{22}$, also determined from FIG. 6B. As a further check on this method of integrating from different directions and different reference points, it can be seen from the shadow graph of FIG. 6C that $Z_{34}-Z_{33}$ equals area D and $Z_{32}-Z_{31}$ equals area E.

Figure 7B:
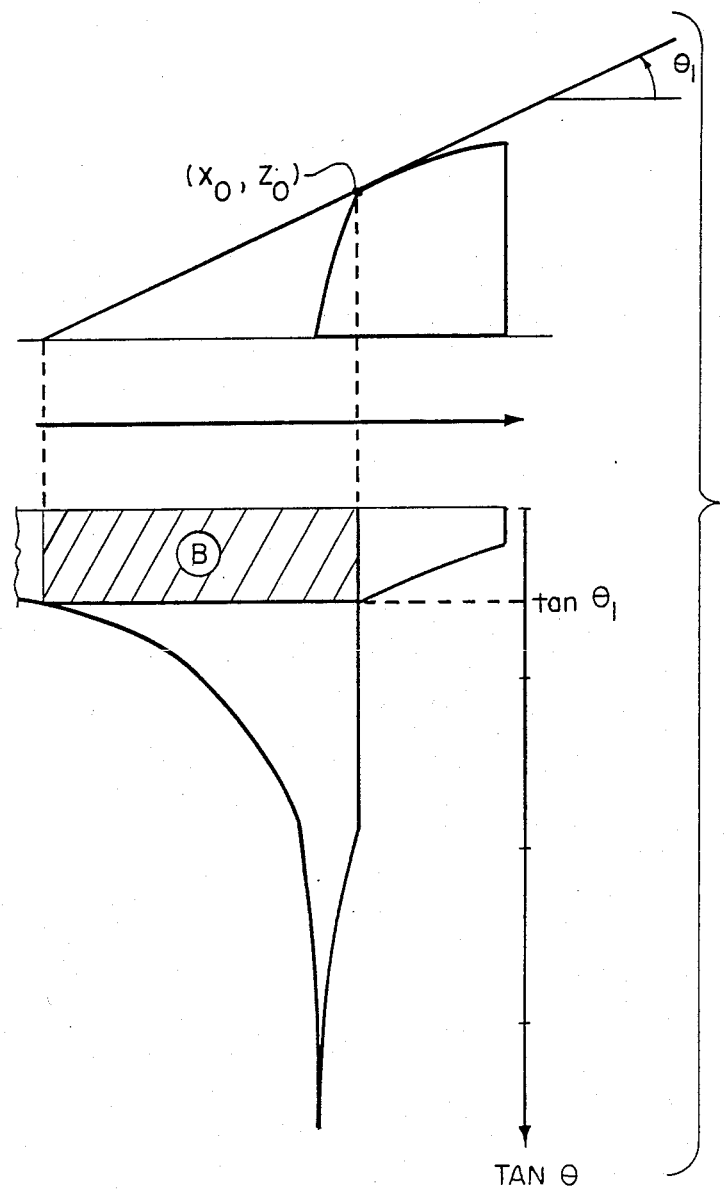
Figure 7C:
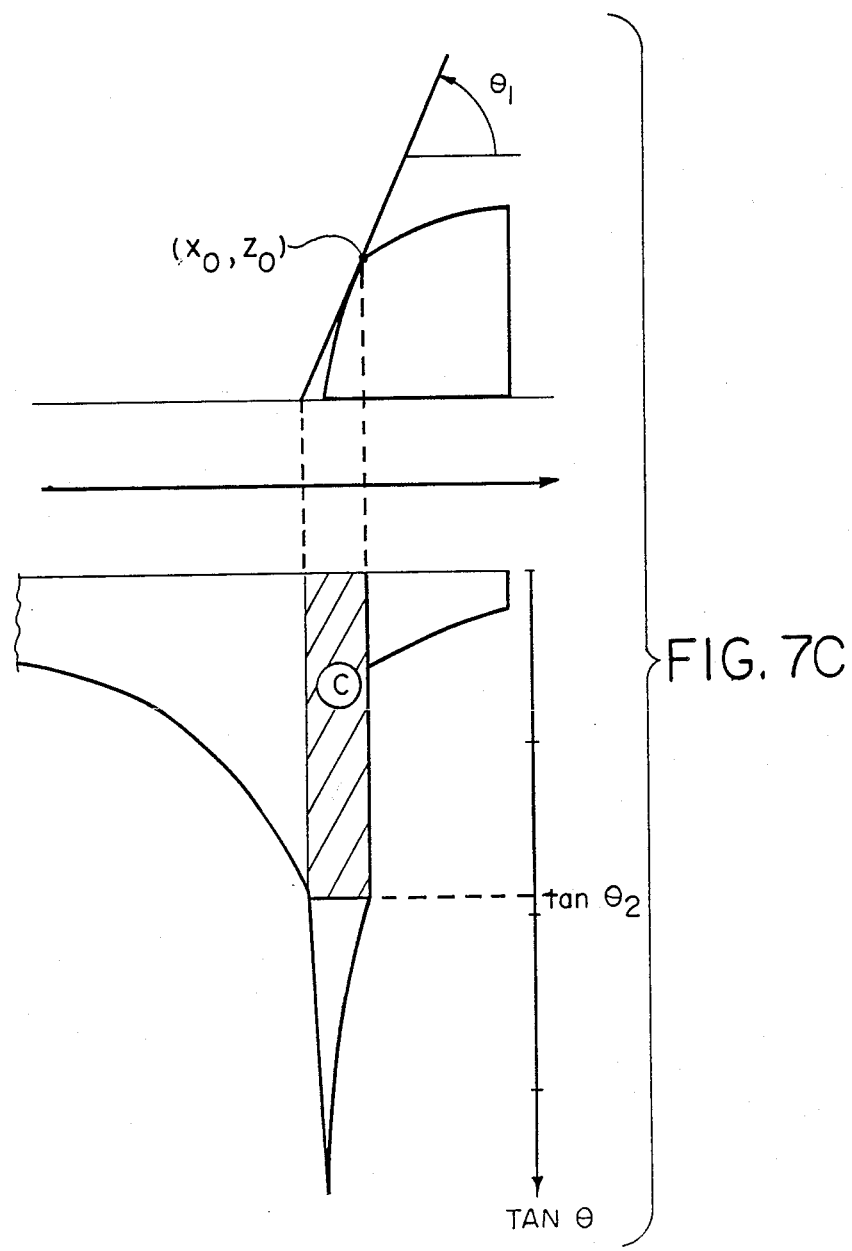

Still more complex structures may produce discontinuities in their shadow information. However the discontinuities do not prevent reconstruction according to the novel method. For example FIGS. 7A–C illustrates a section similar to that of FIG. 2 except that the curved surface includes a discontinuity. The shadow graph produced by illuminating, the object in angles from just above 0° to just below 90° is shown in FIGS. 7A–C. The discontinuity in the object produces a discontinuity in the shadow graph. The height positions on the object can be determined using the technique explained for FIG. 6. When the coordinates of the discontinuity are known, points in either direction can be found by triangulation as illustrated by areas B and C in FIGS. 7B and 7C, respectively. Moreover, when a reference point on the object is established, piecewise integration using equation 2 can be employed. Area A of FIG. 7A, which equals $Z_2-Z_1$, is an example of integration across the discontinuity.

Extremely complex shapes may produce shadow information curves having a large number of variations, i.e. significant fine structure. The envelopes of those curves permit reconstruction of the visible surfaces of objects with precision sufficient for most applications. By considering only the envelope of the shadow graph, fine structure produced by holes or spaces cut into an object is eliminated from the reconstruction. Only the visible external surface of ana object will be reconstructed from an envelope of a shadow graph.

Figure 8:
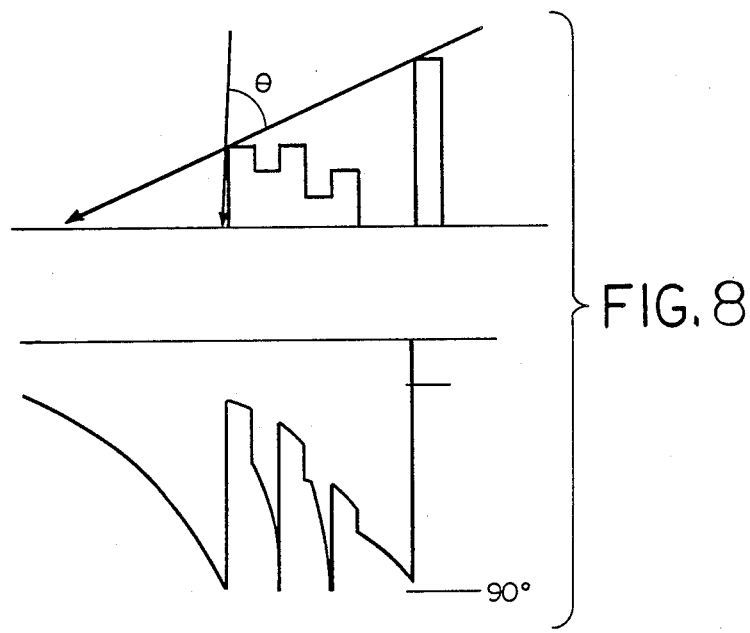
FIG. 8 is an illustration of a method and apparatus for simplifying shadow graph information.

A further simplification is reducing the complexity of graphed shadow information includes erecting a wall higher than the object, next to the object. As shown is FIG. 8, the light position need only scan through the arc theta in order to give sufficient shadow information to reconstruct the object. The arc begins at grazing incidence of the wall and ends when the object is fully illuminated, i.e. near 90° to the reference surface. In addition, FIG. 8 also illustrates the effect of discontinuities in an object on the shadow graph.

The reconstruction information can be used by computer to accomplish other tasks. For example, if the reference surface is the bottom surface of a bin containing parts for a machine, the novel process can be used to determine the location, orientation and surfaces of objects disposed within the bin. The location, orientation and surface information thus determined can be used by computer to position a robot gripper to retrieve an object from the bin.

In practice, when a CCD camera is used in conjunction with a computer, generation of the shadowgrams and reconstruction of the object involves various approximations that can affect the accuracy of the reconstruction. FIGS. 9–12 illustrate the robustness of the method, that is, the insensitivity of the result to changes in various variables. In these figures, discrete shadow information is employed. That is, shadow lengths and locations are measured at discrete orientations of the light source rather than as the light orientation varies continuously through an arc. The discretized technique provides a good approximation on continuous shadow information. Z-axis dimension reconstruction may be performed from discrete shadow graphs with acceptable accuracy using known numerical integration methods.

Figure 5:
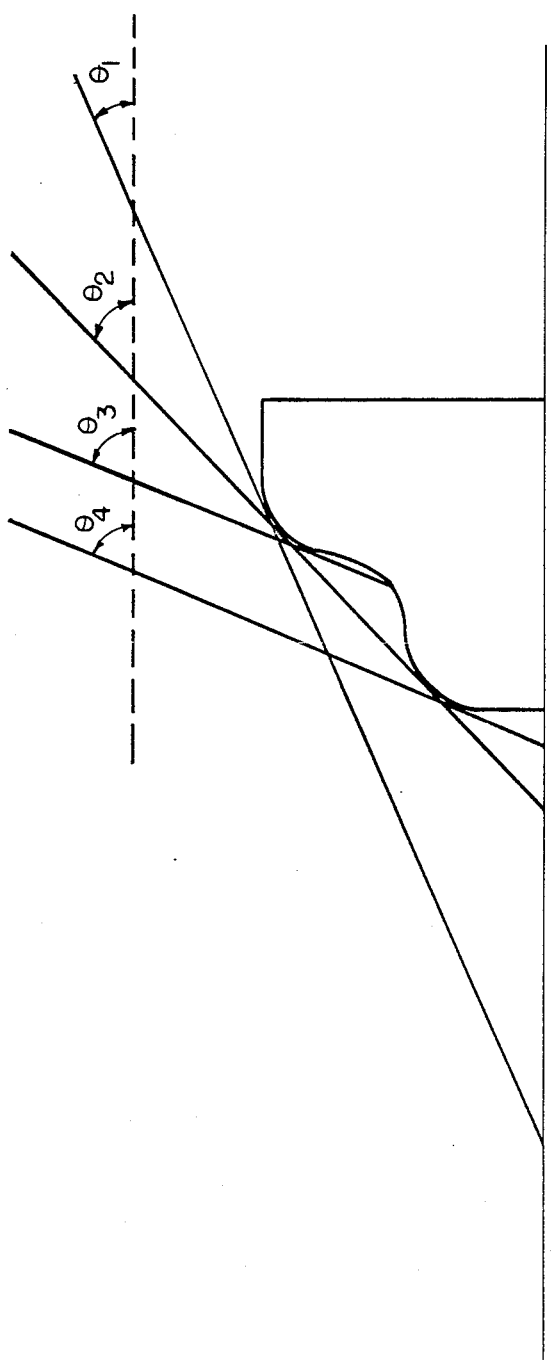
FIG. 5 is a section of an object for reconstruction according to the method of the invention.
Figure 9:
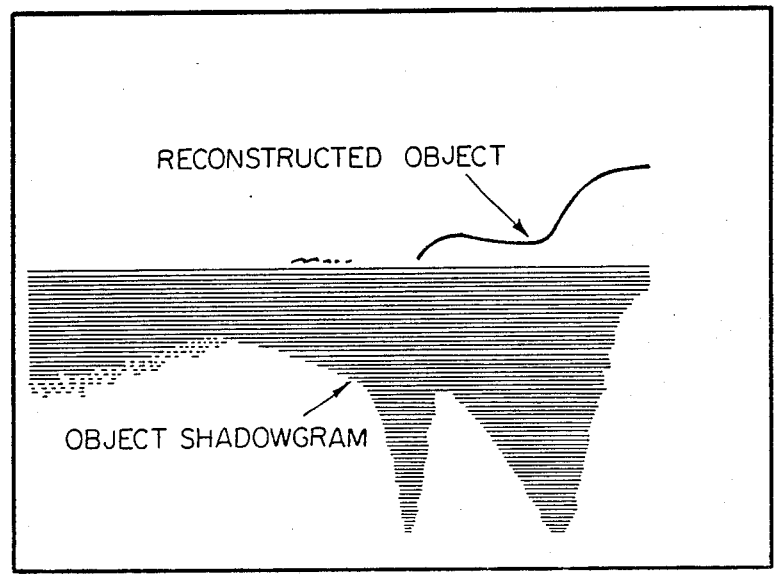
FIG. 9 shows actual shadow information and a partial reconstruction of an object from that shadow information, all according to the invention.
Figure 10:
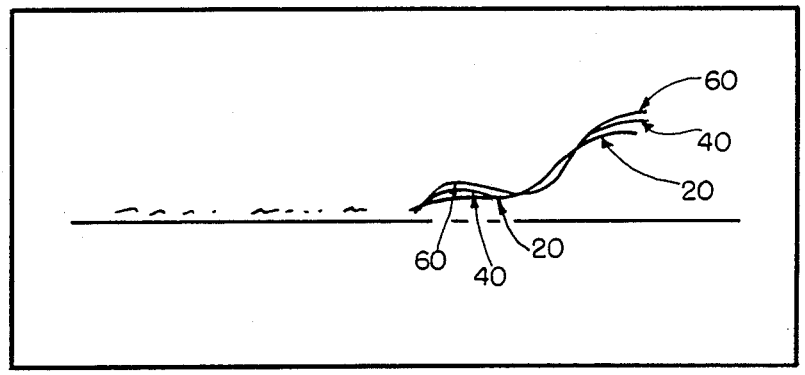
FIG. 10 displays examples of several reconstructions of the section of the object shown in FIG. 9 according to embodiments of the invention.

Turning to FIG. 9, actual, experimentally measured shadow information for a number of discrete light source orientations for a slice of the object of FIG. 5 is shown. FIG. 9 was produced by measuring, i.e. recording, the length and location of each shadow as the orientation of the light source with respect to a planar reference surface was moved from a theta approximately equal to 0° through a theta approximately equal to 70°. Sixty equal increments of light position, 1.16° each, were used. The shadows were measured with a CCD camera having a gray scale including 256 steps for each pixel. A threshold of 45 steps was applied. That is, a brightness exceeding the 45th step of the gray scale was considered to be produced by an illuminated pixel and at the 45th step and lower, a pixel was considered to be in a shadow. Sixty horizontal lines, one corresponding to each angular position and each having the length of the shadow corresponding to the angular position for a slice of the object, are plotted in FIG. 9. From that plot, the calculated third dimensions of the object are plotted in the upper part of the figure showing a high quality reconstruction.

in FIG. 10, three reconstructions are shown based upon different shadow information (not shown) taken from the same source data. A different threshold test was applied before the lines of each discrete shadow information graph were drawn. Thresholds of the 20th, 40th and 60th step in the gray scale of the CCD camera were applied as indicated for the respective reconstructions in FIG. 10. While the resolution of the reconstruction changes with an increase in the threshold, the reconstructions show that a variation in gray scale by a factor of 3 does not produce significantly different reconstructions. This result shows the relative insensitivity of the novel method to the gray scale threshold test once a minimum step is passed. It further shows that a camera having a gray scale with fewer than 256 steps can provide satisfactory results in application of the method.

Figure 11:
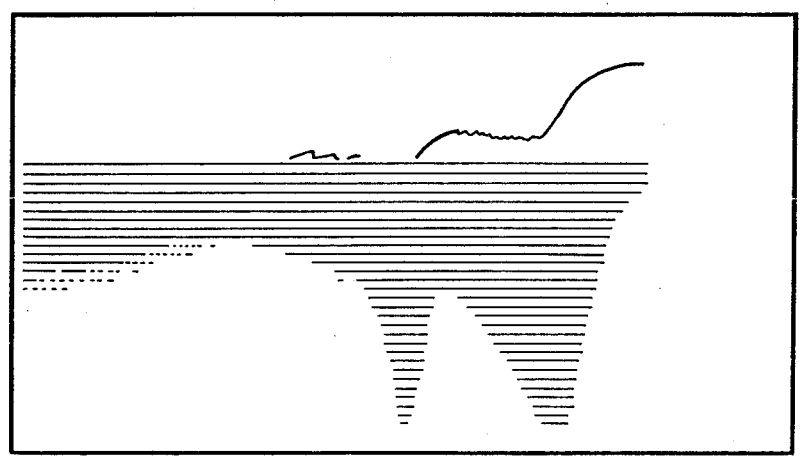
FIG. 11 shows actual shadow information and a partial reconstruction of an object from that shadow information, all according to the invention.

In FIG. 11 discrete shadow information like that from FIG. 9 is shown except that only half as many horizontal lines are plotted. This corresponds to disposing the light at increments of 2.32° or rejecting the alternate horizontal lines in FIG. 9. In the upper part of FIG. 11, the reconstruction of the object's surface is shown based upon this shadow information. As with FIGS. 9, 10 and 12, the reconstruction employs simple numerical integration using the horizontal lines of the shadow graph. As is apparent from the figure, the loss of information results in some noise-like variation in the reconstructed surface. This noise is minimized in the integration process in the reconstruction. Integration acts, by its nature, as a low pass filter, eliminating some noise. Nevertheless, the error introduced by having the input information is not significant.

Figure 12:
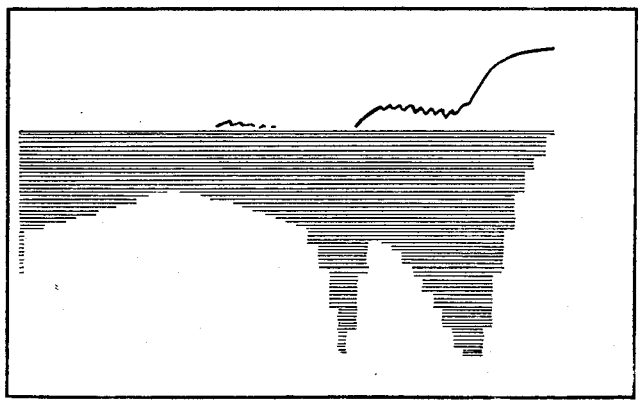
FIG. 12 shows actual shadow information and a partial reconstruction of an object from that shadow information, all according to the invention.

Finally, in FIG. 12 the same shadow information of FIG. 10 is employed, except the resolution of the CCD camera is reduced by a factor of 4. The resulting object reconstruction contains considerable noise indicating some dependence of the accuracy of the results on the resolution of the device used to measure shadow length. However, as FIG. 12 indicates, only twenty pixels are used to reconstruct the object in this example of the method. With so few pixels, a very coarse sensitivity, the reconstruction accuracy is remarkably good.

Figure 13:
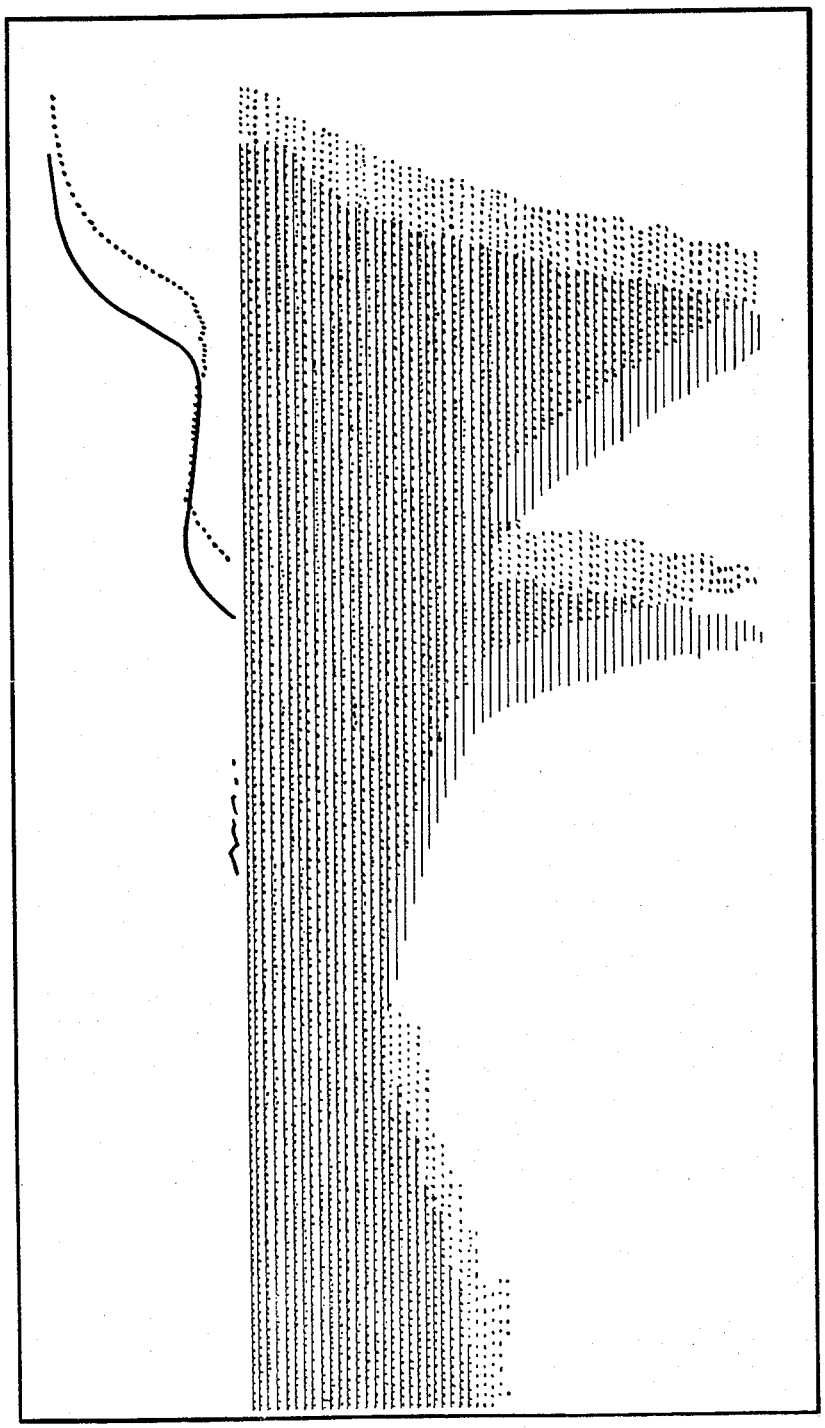
FIG. 13 illustrates two actual reconstructions of different sections of the same object all according to the method of the invention.

FIG. 13 illustrates the utility of the method in reconstructing a three-dimensional object so that further activity, such as selecting an object from a bin, can be carried out. The reconstructions of FIGS. 9–12 are based on a single slice of an object shown in FIG. 5. If that object has the same cross-section and that cross-section varies in position with depth, reconstructions from a shadow information will reveal that orientation. An example of such a result in shown in FIG. 13 in which shadow information and reconstructions for two different slices of the same object are shown. The reconstructions are offset with respect to each other indicating the object's orientation. By continuing to make additional reconstructions, the locations of the surfaces of the object can be determined.

Figure 14:
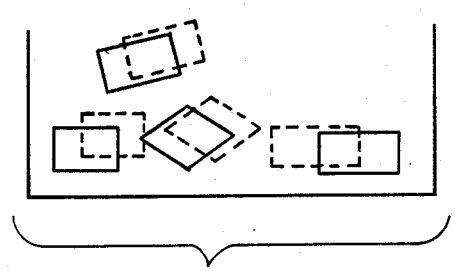
FIG. 14 is a section of a bin containing a number of objects.
Figure 15:
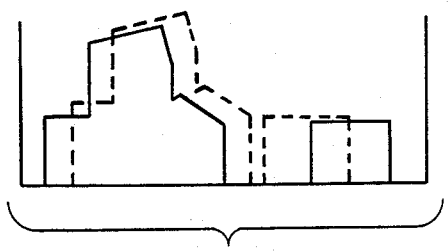
FIG. 15 schematically illustrates reconstructed surfaces of several objects in a bin.

For example, FIGS. 14 and 15, respectively, show schematically a sectioned bin and two superimposed sectional reconstructions (one solid, one broken) for each of a number of objects in the bins. From the reconstructed data of FIG. 15 instructions can be given to a robot gripper so that it may be positioned to grasp one of the objects and remove it from a bin.

While the invention has been described with respect to a planar reference surface, the method is not limited to that sort of surface. Any reference surface on which the object may be placed can be used provided the shape of the surface is known. In making the reconstruction, compensating changes are made in the calculations to remove the effects of a nonplanar surface.

Figure 16:
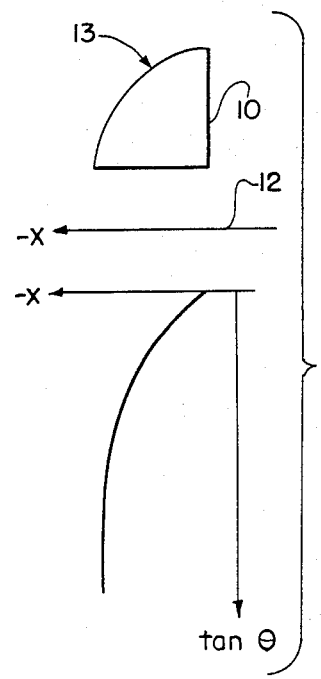
FIG. 16 is a sectional view of an object not disposed on a reference surface and the shadow information produced in accordance with the invention.

Shadow information for part of an object to be reconstructed may be obtained in the absence of a reference surface. An example is shown in FIG. 16 where object 10 of FIG. 2 is shown disposed, for convenience of description only, relative to, but not touching, a reference surface 12. The shadow graph is plotted as if surface 12 were not present. The graph is useful over the range of theta from 0° to near 90° so that the top surface, i.e. surface 13, the same surface reconstructed before, can be reconstructed between its extreme lateral edges. At left hand edge of the object, the shadow information becomes useless for surface reconstruction, but there is no surface there to reconstruct. Nonetheless, the surface is accurately reconstructed between its extreme left and right edges.

The invention has been described with respect to a plurality of light positions that follow a generally azimuthal path relative to an object. In an allied or supplementary method, the radiant energy source may follow an equatorial path relative to an object or objects being illuminated. In that situation, the light and dark information, i.e. light and shadows, is of a somewhat different character.

Figure 17:
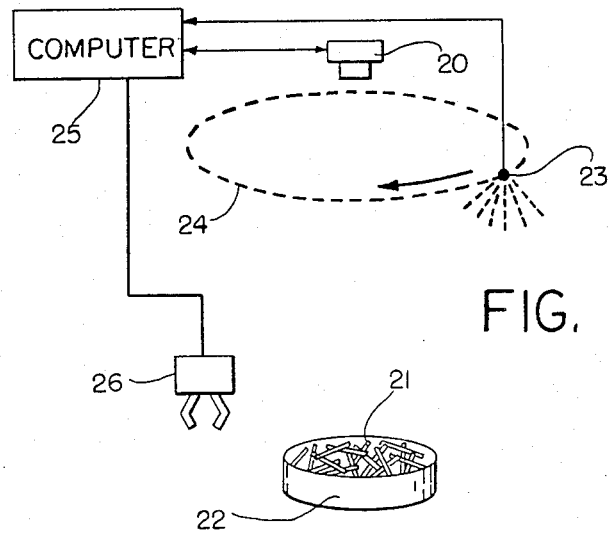
FIG. 17 is a pictorial view of apparatus according to one embodiment of the invention.

Apparatus for practicing the allied method is shown in FIG. 17. A camera or observer 20 is disposed above an object or objects. In FIG. 17, the object is a number of articles 21 disposed in a bin 22. A light source 23 that emits parallel rays of light or is made to emit parallel rays by the use of lenses, apertures, etc., moves in an equatorial path 24 relative to bin 22. As described with respect to FIG. 1, light source 23 may consist of a plurality of light sources, each of which is illuminated in sequence so that effective source movement is obtained. Or, the light source could include mirrors used with a stationary light source in order to obtain the movement desired.

Camera 20 may be a conventional film camera or, preferable, an electronic camera, such as a CCD camera that supplies images in the form of electronic signals to a computer 25. Preferably, computer 25 controls the position of the light source or senses that position so that the images can be easily correlated when overlaid.

The images, whether formed on film or electronically, obtained by camera 20 are compared by superposition. Surfaces on top, that is surfaces on articles 21 that are not obscured by another article will be constantly illuminated by the light source. These surfaces are identified in the superposition so that the topmost surface can be identified and located. A robot gripper 26 can then be directed to grasp the topmost article and remove it from the bin.

Figure 18A:
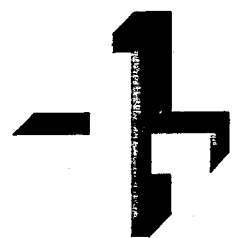
FIGS. 18A-H are examples of images formed in the novel equatorial illumination method.
Figure 18B:
Figure 18C:
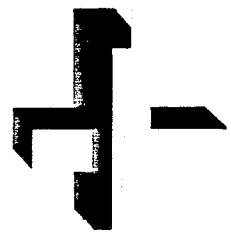
Figure 18D:
Figure 18E:
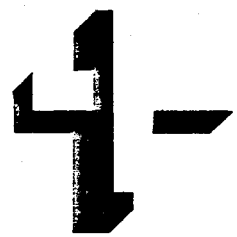
Figure 18F:
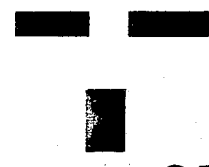
Figure 18G:
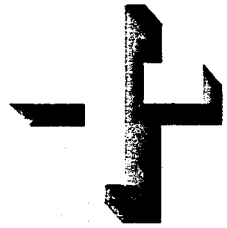
Figure 18H:
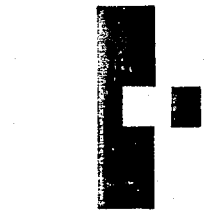

An example of the method is illustrated in FIGS. 18A–H. There, the binary images, i.e. each point being either all white or all black, corresponding to illumination and shadow, respectively, for two objects in a bin are shown for 45° illumination intervals. That is, in FIG. 18A the articles are illuminated from the 225° point on the equatorial circle of FIG. 17, where east is 0° and north is 90°. In FIG. 18B the illumination point is 270°, i.e. From the south according to the figure orientation. Likewise, FIGS. 18C through 18H in moving from a 45° step in illumination position is taken between each sequential image.

Figure 19:
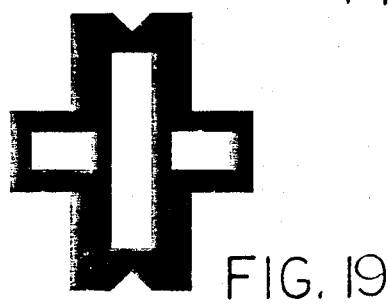
FIGS. 19 and 20 are examples of composite images formed according to the novel equatorial illumination method.
Figure 20:
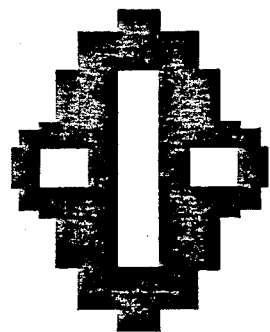

In FIG. 19, four images, equally spaced from each other (a, c, e, and g), out of the eight images FIGS. 18A–H are superposed with each point that is black in at least one of the four pictures being shown as black in the composite picture. The largest continuous white area represents a surface of the topmost article. In FIG. 20, all eight of the FIGS. 18A–H are superposed in the same manner as for FIG. 19. The composite of FIG. 20 further shows the position of the top surface of the uppermost article. As can be discerned from FIGS.

18A-H articles here consist of two rectangular parallelepipeds stacked one on top of the other at right angles.

The equatorial method also is effective with complex shapes, including curved surfaces. It is dependent for its operation only on distinguishing light from darkness and so is independent of the texture of the surfaces being illuminated. Because of its binary nature, the method is not readily susceptible to noise.

The equatorial method just described may be used as a coarse beginning step before the more precise and complex azimuthal method is applied. By following that sequence, a priori knowledge of surfaces may be obtained to aid the azimuthal process. However, such a priori knowledge is not necessary to the success of the azimuthal method.

The invention has been described with respect to certain preferred embodiments. Various modifications and additions within the spirit of the invention will occur to those of skill in the art. Accordingly, the scope of the invention is solely limited by the following claims.

I claim:

1. A method of reconstructing the third dimension of an object comprising:
    disposing said object in a fixed position relative to a reference surface;
    projecting substantially parallel rays of radiant energy at said object at a plurality of different angles relative to said reference surface;
    recording the relative locations and lengths of each of the shadows cast by the object at each of said angles, said shadows including portions thereof formed on the reference surface; and
    determining from the length and relative location of each of said shadows cast and from the angle, relative to the reference surface, of the radiant energy at which said shadow is cast, the position of at least one point on a surface of said object relative to another point on said object.

2. The method of claim 1 wherein said radiant energy is light.

3. The method of claim 1 including determining the position of a plurality of points on said surface of said object.

4. The method of claim 3 including projecting said energy from each of a plurality of positions relative to said reference surface, all of said positions lying substantially in an azimuthal plane that intersects said object.

5. The method of claim 4 including recording said shadow lengths and locations in said azimuthal plane and wherein said determined points on a surface of said object lie within said azimuthal plane.

6. The method of claim 3 including projecting said energy from each of a plurality of positions relative to said reference surface, all of said positions lying substantially in an equatorial plane.

7. The method of claim 6 including determining said points by superposing at least two of said shadows.

8. The method of claim 1 including projecting said energy from a single source and moving said source relative to said reference surface.

9. The method of claim 1 including sequentially projecting said energy from each of a plurality of energy sources disposed at different orientations relative to said reference surface.

10. The method of claim 1 including projecting said energy from a single source and reflecting energy from said source of each of a plurality of mirrors.

11. The method of claim 1 including positioning a robot gripper in response to the determination of the position of at least one surface of said object.

12. The method of claim 1 including recording the location and length of each of said shadows by forming an image of each of said shadows.

13. The method of claim 12 including forming said images with an electronic camera to generate a plurality of electrical signals indicative of each of the shadow images.

14. The method of claim 13 including applying a threshold test to said plurality of signals and storing as a shadow each signal that falls below said threshold.

15. The method of claim 1 including disposing a wall higher than said object adjacent said object before projecting radiant energy and projecting energy over said wall.

16. The method of claim 1 including simultaneously projecting rays of radiant energy of at least two different wavelengths at said object and simultaneously and separately recording the relative locations and lengths of the shadows cast at each of said wavelengths.

17. The method of claim 1 wherein said shadow lengths and locations are recorded on a film in a camera and wherein said camera in open whenever energy is projected.

18. An apparatus for reconstructing the third dimension of an object comprising:
    a reference surface with respect to which an object may be disposed;
    radiant energy source means for projecting substantially parallel rays of radiant energy from a plurality of different angles relative to said reference surface at a said object disposed relative to said reference surface;
    means for recording the relative locations and lengths of each of the shadows cast by said object at each of said plurality of different angles, said shadows including portions thereby formed on said reference surface; and
    means for determining the location of at least one point on a surface of said object relative to another point on said surface from the respective lengths and locations of said shadows cast and from the respective angles.

19. The apparatus of claim 18 wherein said energy source means comprises a source of substantially parallel rays of energy and means for positioning said source at a plurality of locations lying substantially in a plane.

20. The apparatus of claim 18 wherein said energy source means comprised a plurality of sources of substantially parallel rays disposed substantially within a plane.

21. The apparatus of claim 18 wherein said energy source means comprised a pivotally mounted source of substantially parallel rays of energy and a plurality of mirrors for reflecting energy received from said source.

22. The apparatus of claim 18 wherein said means for recording the location and length of each of said shadows comprises an electronic camera for generating a plurality of electrical signals indicative of a shadow image.

23. The apparatus of claim 19 wherein said means for determining comprises a computer for receiving from said means for recording length and location the recorded shadow lengths and locations and for determining the relative positions of at least one point on said surface.

24. A method of reconstructing the third dimension of an object comprising:
- disposing said object in a fixed position relative to a reference surface;
- projecting substantially parallel rays of radiant energy at said object from a plurality of different equatorial positions relative to said reference surface;
- recording the shadows cast by the object from each of said positions; and
- determining from the recorded shadows the position of a plurality of points on a surface of said object.

25. The method of claim 24 including determining said points by superposing at least two of said shadows.

26. The method of claim 1 including determining the heights of different points on said surface of said object by computing the product of a function of the angle of the radiant energy and the difference between the locations of shadow edges at the angle of radiant energy.

* * * * *